United States Patent Office 3,315,918
Patented Apr. 25, 1967

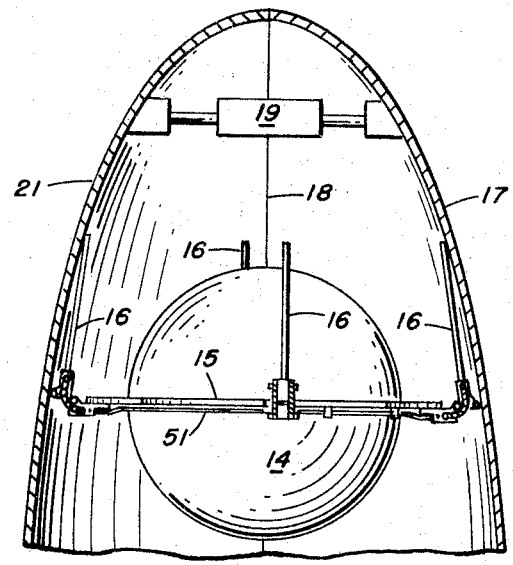
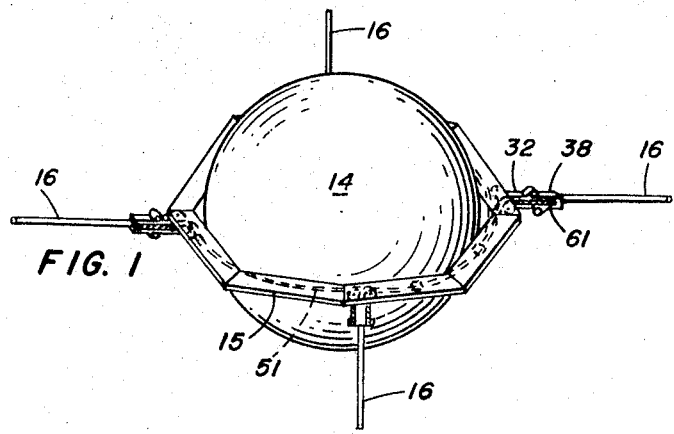
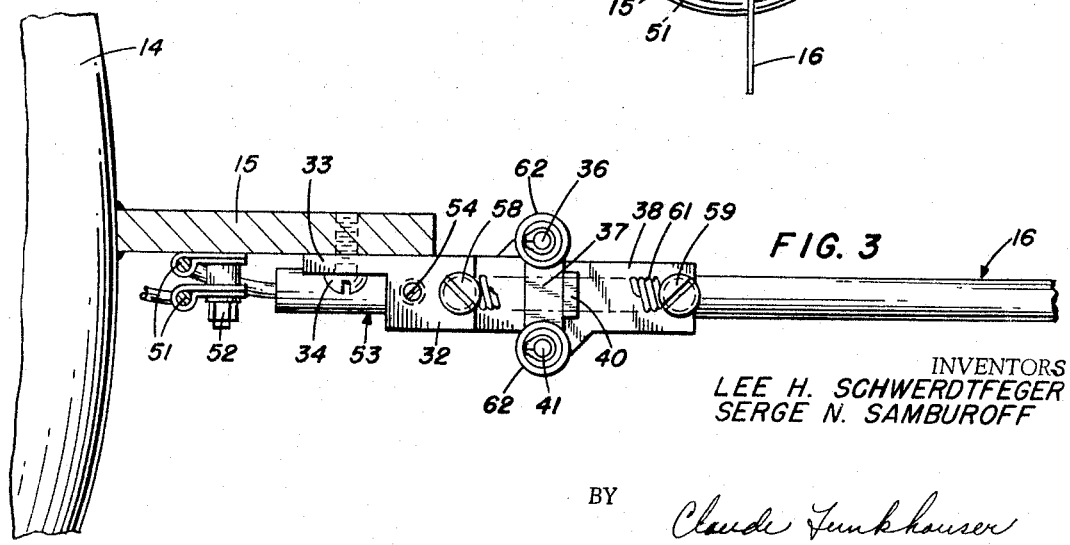

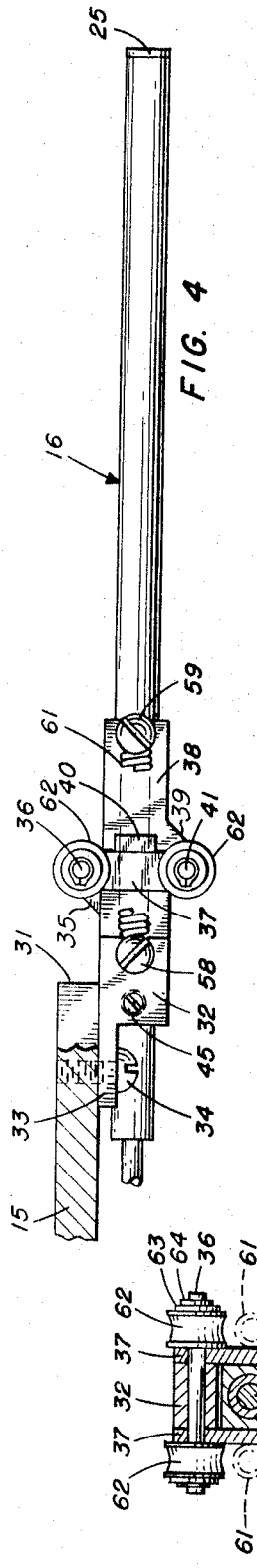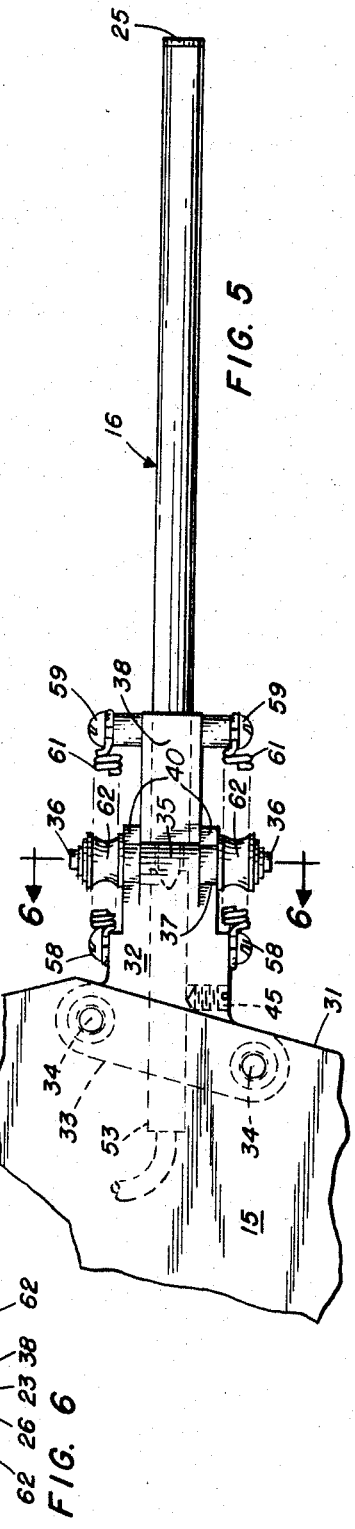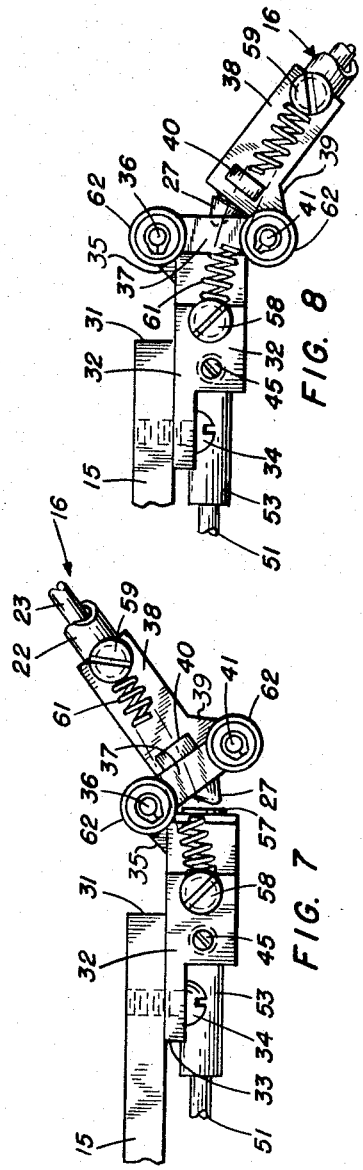

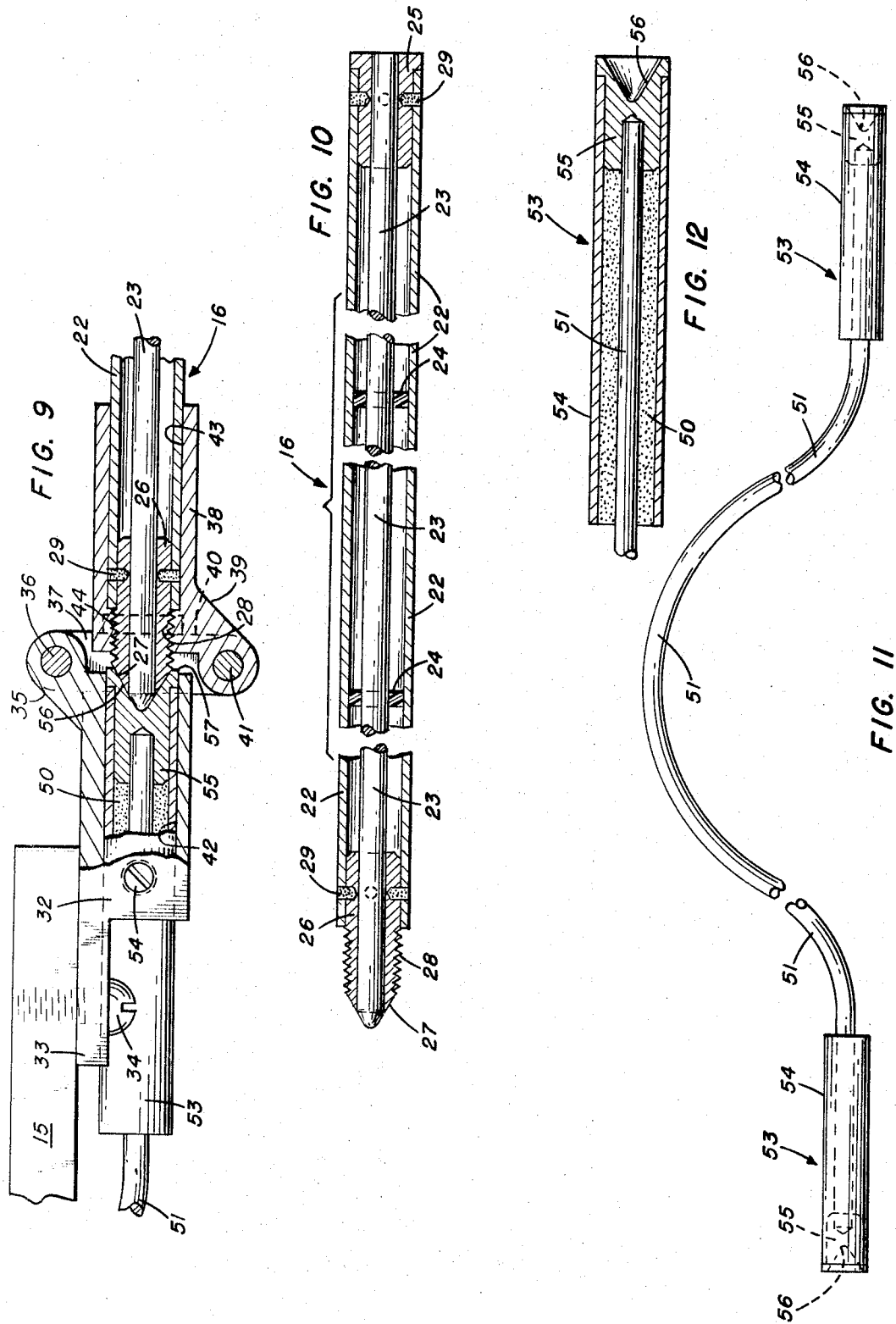

3,315,918
HYSTERESIS ROD HINGE
Lee H. Schwerdtfeger and Serge N. Samburoff, both of Silver Spring, Md., assignors to the United States of America as represented by the Secretary of the Navy
Filed June 14, 1965, Ser. No. 463,971
10 Claims. (Cl. 244—1)

The present invention relates to a satellite stabilization system and more particularly to a means for deploying a hysteresis rod and means for damping the deploying action of that rod, the hysteresis rod when extended serving to dissipate the rotational energy of the satellite.

In the launching of a satellite having hysteresis rods attached, the problem of extending the rods after the satellite is freed from the launching rocket is of prime importance. The rod must be swung or extended to its final position without the necessity of weighty mechanism, and this step must be accomplished without disturbing the path of the satellite, through the inertia of the moving rods, or in any way damaging the rods through the movement. Rods located on opposite sides of the satellite function better when opposite rods are magnetically connected. This connection must be effective at the final position of the rods. The rods should be of light weight yet sufficiently strong to provide the necessary function.

It is an object of the present invention to provide a hysteresis rod hinge that retains magnetic continuity between opposite rods in the deployed position as well as being provided with overtravel and self-damping features to reduce the shock transmitted to the satellite upon deployment of the rods.

It is another object of the present invention to provide hysteresis rods so mounted on a double hinge as to permit the rods to be folded while in the rocket and to permit the rods to be swung to extended position with the freeing of the satellite from the nose of the rocket, allowing the rods to swing past the center or extended position and to return to the extended or center position with gradually reduced arcs.

It is a still further object of the present invention to provide means associated with the double hinges for constantly urging the rods to extended position and to maintain the rods in extended position.

Other objects, advantages and novel features of the present invention will become apparent from the following detailed description of the invention when considered in conjunction with the accompanying drawings wherein:

FIG. 1 is a perspective view of the satellite with the hysteresis rods extended;

FIG. 2 is a cross-section through the nose cone of the rocket showing the hysteresis rods in folded position;

FIG. 3 is a section taken through the satellite band showing the means of attaching the rod to the band;

FIG. 4 is a side elevation of the hysteresis rod in extended position;

FIG. 5 is a top view of the hysteresis rod and supporting hinge;

FIG. 6 is a cross-section taken on line 6—6 of FIG. 5;

FIG. 7 is a side view, similar to FIG. 4, showing the hysteresis rod starting the swing from folded position;

FIG. 8 is a view, similar to FIG. 7, showing the hysteresis rod as it has swung past its center position;

FIG. 9 is a cross-section through the rod and hinge showing the connection to maintain magnetic continuity with the opposite rod;

FIG. 10 is a longitudinal section view of the hysteresis rod;

FIG. 11 is a plan view of the connecting rod located between opposite rods; and

FIG. 12 is a cross-section of the connecting link of the connecting rod.

Referring to the drawings and particularly to FIGS. 1 and 2, a satellite 14 is illustrated with a circumferential band 15 supporting diametrically oppositely mounted hysteresis rods 16. As all of the rods are identical, the description will be for a single rod. The satellite is normally launched in the nose cone 17 of a rocket and is diagrammatically illustrated in FIG. 2. The nose cone 17 is scored at 18 and an explosive bolt 19 is arranged across the nose cone so that initiation of the explosive bolt 19 will rupture the nose cone along the scored lines and free the satellite. During the launching operation, the hysteresis rods 16 are folded substantially tangent to the satellite and held in place by contact with the side 21 of the nose cone 17. With the rupture of the nose cone the hysteresis rods are freed of the restraining side.

Referring particularly to FIG. 10, the hysteresis rods 16 are of hollow tubular construction having an outside tube 22 and an inner rod 23, spaced from one another by washers 24 formed of Mumetal or other metal having magnetic insulation qualities. At the forward or outer end of the hysteresis rod 16 a plug 25 fits both the outer tube 22 and the inner rod 23, the inner rod extending through the plug to the extreme end of the rod. The inner end of the hysteresis rod 16 is also fitted with a plug 26 which is bored to receive the inner rod 23 and is formed together with the end of the rod 23 into a conical-shaped end 27. Outward from the conical end the plug 26 is threaded at 28 and attached to the tube 22 by epoxy plugs 29. The inner rod 23 extends from the extreme outer end to the tip of the cone at the inner end of the rod.

The oppositely disposed hysteresis rods are connected by a connector cable 51 which extends around the satellite 14 just under the band to which it is attached by fasteners 52. On each end of the cable 51 connecting links 53 form the terminals which meet and connect to the ends of the hysteresis rods. Each of these links 53 (FIG. 12) is formed with a tube 54 about the ends of the cable 51 which are encased in a plug 55. The plug 55 is formed with a conical socket 56 at its extreme end. Some filler such as an epoxy cement 50 fills the remainder of the space between the tube 54 and the cable 51.

Referring particularly to FIGS. 4–8, the mounting of the hysteresis rods to the circumferential band is illustrated with the band 15 being formed with flats 31 making the outer contour of the band octagonal. At the angle of the band, the inner fixed hinge plate 32, rectangular in shape and formed with a flange 33 at its inner end, is attached to the band by screws 34 passing through the flange portion 33 and threaded into the band 15. This position of the hinge at the outermost portion of the satellite eliminates possibility of contact with other portions of the band and allows the hysteresis rod to swing without contacting the satellite.

The end portion opposite the plate 32 extends beyond the body of the rectangular hinge portion to form a pivot block 35 which is bored to receive a hinge pin 36 which pin extends beyond the pivot block at each end.

Mounted on the extended ends of the pin 36 a pair of hinge plates 37 form the center portion of a double swinging hinge. A second rectangular hinge plate 38, similar in construction to the plate 32 attached to the band 15, is formed with a pivot block 39 which is bored to receive a pin 41 and is secured at its outer end to the hysteresis rod 16. The pin 41 receives the other ends of the hinge plates 28 on its extended ends similarly to the pin 36 to form the double hinge attached at one side to the circumferential band and at the other side to the hysteresis rod. Stops 40 are secured or made integral with plate 38 to limit the relative movement of plate 38 and the hinge plates 37.

Both of the hinge plates 32 and 38 are bored as shown respectively at 42 and 43 (FIG. 9). The hinge plate 38 is threaded at 44 to receive the threaded end 28 of the hysteresis rod which extends beyond the end of plate 38 and into the bore 42 of the plate 32. The inner fixed hinge plate 32, bored at 42 receives the connecter link 53 which extends through the bore 42 and is secured in that bore by screw 54. The adjustment of the connecter with relation to the fixed hinge plate 32 is critical, the end 57 of the connecter must be spaced an exact distance beyond the fixed hinge plate 32 in order to exactly and firmly contact the conical end 27 of the hysteresis rod. This adjustment is such that the rod when in its extended position will exactly fit into the conical socket 56 and insure magnetic continuity between the oppositely disposed hysteresis rods.

Referring particularly to FIGS. 4-8, the plates 32 and 38 have screws 58 and 59, respectively threaded thereinto. Each of these screws receive and retain the ends of a pair of coiled springs 61. The springs are located along a longitudinal line on each side of the hysteresis rod connection with the hinge plate. On the extended ends of the pins 36 and 41, rollers 62 are journaled. The rollers 62 are secured by washers 63 and locking clips 64.

Previous to the launching of the satellite, the rods are folded substantially tangential to the spherical body and the satellite is placed in the nose cone of a rocket. The plastic side of the nose cone is scored so that explosion of an explosive bolt will rupture the nose cone and free the satellite. With the removal of the restraining side wall of the nose cone, the rods, which have been folded under the tension of the springs 61, stretched around the contour of the rollers 62, respond to the action of the springs 61 and swing outward. The force of the springs is sufficient to swing the rods past the center position and swing a considerable arc to the other side of the center causing the springs to tense against the opposite rollers. With gradually diminishing arcs the hysteresis rods finally assume a position normal to the spherical satellite, the connection between the rod and the connecting cable previously described forming magnetic continuity from one hysteresis rod to its diametrically opposed rod. The oscillation of the rods being gradually damped through the action of the springs and the double hinge, the course of the satellite may not be disturbed and the delicate hysteresis rods will not be damaged.

Obviously many modifications and variations of the present invention are possible in the light of the above teachings. It is therefore to be understood that within the scope of the appended claims the invention may be practiced otherwise than as specifically described.

What is claimed is:
1. In a satellite of substantially spherical form, an apparatus for dissipating the rotational energy about one of its axes comprising
   a fixed circumferential exterior band on the satellite;
   a plurality of hysteresis rods;
   means for attaching the rods to the band for pivotal movement relative to the band; and
   means associated with the pivotal means tending to swing the rods about the pivot when said rods are in a position tangent to the satellite and to dampen the pivotal movement and position the rods normal to the satellite.

2. An apparatus for dissipating the rotational energy according to claim 1 wherein the means associated with the pivotal means is a pair of coiled springs.

3. An apparatus for dissipating the rotational energy according to claim 1 wherein opposing pairs of rods are connected to provide magnetic continuity.

4. A hysteresis rod hinge support for a satellite having an exterior circumferential band comprising
   a double action hinge secured to the band and to the hysteresis rod;
   pivot pins forming part of the double action hinge and extending beyond said double action hinge;
   rollers mounted on the ends of said pivot pins beyond said double action hinge; and
   means secured to the outer plates of said double action hinge continually urging said hinge to one position, said means contacting said rollers when said hinge is moved from said one position.

5. A hinge support as claimed in claim 4 wherein the means secured to the hinge comprises a pair of coil springs which when the rod is pivoted on the double action hinge, each spring engages the roller in its plane and the roller serves as a fulcrum, about which the spring is curved.

6. In a satellite formed with a circumferential exterior band
   a plurality of hysteresis rods attached to said band as magnetically coupled pairs; and
   means connected to said rods and to said band to produce pivotal movement of the rods when said rods are in a position tangential to the surface of the satellite, said means resisting pivotal movement of the rods when said rods are in a position normal to the surface of the satellite.

7. In a satellite of substantial spherical shape and having an exterior band around its circumference, a support for a plurality of hysteresis rods comprising
   a first hinge plate secured to the band;
   a pair of hinge plates pivotally connected to the first hinge plate by means of a pivot pin;
   a second hinge plate pivotally connected to the pair of hinge plates by means of a second pivot pin, said second hinge plate being pivotally connected to and supporting a single hysteresis rod;
   grooved rollers carried at the ends of each of the pivot pins; and
   pairs of coiled springs secured at one end to the first plate and at the other end to the second plate, said springs being in their unstressed position when the hysteresis rods are in a position normal to the satellite and in a stressed position when the rods are in any other position, said springs when in stressed position serving to move the rods to a position normal to the satellite, said springs when in a stressed position engaging the grooved rollers of one of the pivot pins.

8. A hysteresis rod for a satellite comprising
   an outer tubular member;
   an inner slender rod member;
   magnetically insulating means supporting said inner member concentric and longitudinally of said outer member;
   a cap plug covering one end of said tubular member and being bored to receive the end of said inner rod member, said rod member extending to the extreme end of said plug; and
   a second plug member located at the other end of the tubular member and extending beyond said tubular member, said second plug being bored to receive the inner rod member, said rod member and said second plug together forming a conical end for the hysteresis rod, said second plug having its portion between the conical end and the tubular outer member threaded.

9. A hysteresis rod according to claim 8 wherein the magnetically insulating means are Mumetal washers.

10. In a substantially spherical satellite having a circumferential exterior band, an apparatus for dissipating the rotational energy of the satellite comprising
    a plurality of hysteresis rods;
    double hinges, each having fixed plates secured to the circumferential band;
    a second plate secured to each one of said hysteresis rods and pivoted pairs of plates connecting said fixed plate with the hysteresis rod plate in double hinge action, the fixed plate and the hysteresis rod plate being formed with a bore;
    a plug secured to and forming the end of each of the hysteresis rods, said plug being formed with a conical end, each of said rods with its conical plug end being inserted and secured in the bore of each of the second plates of each of the double hinges;

connecting cables connecting opposed hysteresis rods; a connector link carried on each end of said connecting cables designed to connect opposite hysteresis rods, each of said links being received in the fixed plate of each of said double hinges; and a plug formed with a conical socket forming the end of each of said connector links, said plug being adjusted and secured in relation to the fixed plate of said double hinge as to receive the conical plug of the hysteresis rod to provide magnetical continuity between opposed hysteresis rods through said connecting cable.

References Cited by the Examiner
UNITED STATES PATENTS

| | | | |
|---|---|---|---|
| 3,063,741 | 11/1962 | Bockerman | 16—182 X |
| 3,148,846 | 9/1964 | Newton | 244—1 |
| 3,190,581 | 6/1965 | Wilson | 244—1 |
| 3,277,486 | 10/1966 | Kuebler | 244—1 |
| 3,282,532 | 11/1966 | Tinling et al. | 244—1 |

FERGUS S. MIDDLETON, *Primary Examiner.*